(12) United States Patent
Westphal et al.

(10) Patent No.: US 8,575,505 B2
(45) Date of Patent: Nov. 5, 2013

(54) ILLUMINATED BUTTON FOR AN OPERATOR CONTROL ARRANGEMENT, OPERATOR CONTROL ARRANGEMENT AND DOMESTIC APPLIANCE

(75) Inventors: Michael Westphal, Ahrensfelde (DE); Roland Meyer, Bernau/OT Börnicke (DE)

(73) Assignee: PAS Deutschland GmbH, Neuruppin (DE)

( * ) Notice: Subject to any disclaimer, the term of this patent is extended or adjusted under 35 U.S.C. 154(b) by 0 days.

(21) Appl. No.: 13/462,513

(22) Filed: May 2, 2012

(65) Prior Publication Data

US 2012/0298492 A1 Nov. 29, 2012

Related U.S. Application Data

(63) Continuation of application No. PCT/EP2010/066523, filed on Oct. 29, 2010.

(30) Foreign Application Priority Data

Nov. 2, 2009 (DE) .......................... 10 2009 051617

(51) Int. Cl.
*H01H 9/00* (2006.01)
(52) U.S. Cl.
USPC ....................................................... 200/314
(58) Field of Classification Search
USPC ......... 200/310–314, 431, 439, 440, 443, 450, 200/460, 463, 468, 506, 510, 520–522, 535, 200/537, 556, 557, 308, 317, 327, 341
See application file for complete search history.

(56) References Cited

U.S. PATENT DOCUMENTS

| 4,163,883 A | 8/1979 | Boulanger |
| 4,225,766 A | 9/1980 | Pfeifer |

(Continued)

FOREIGN PATENT DOCUMENTS

| DE | 7814996 U1 | 10/1979 |
| DE | 29510010 U1 | 1/1996 |

(Continued)

OTHER PUBLICATIONS

WIPO, PCT/ISA/220 Form for PCT Application PCT/EP2010/066523 (parent application of 12688918), Apr. 5, 2011, 11 pages (German).

(Continued)

*Primary Examiner* — Edwin A. Leon
*Assistant Examiner* — Anthony R. Jimenez
(74) *Attorney, Agent, or Firm* — Kevin E. Flynn; Flynn IP Law

(57) ABSTRACT

In an embodiment, there is disclosed a button for an operator control arrangement, wherein the button has a shaped body which is composed of a light-guiding material, the shaped body including an operating direction, a functional side which has a light entry region and an operating region, an operator control side which has a light exit region, a resilient projection which is integrally formed with the shaped body transverse to the operating direction, a force limiting element which is integrally formed with the shaped body transverse to the operating direction and is configured to absorb an excessive operating force, and a first projection which is integrally formed with the shaped body. Other embodiments of a button, an operator control arrangement and a domestic appliance are also disclosed.

20 Claims, 4 Drawing Sheets

(56) References Cited

U.S. PATENT DOCUMENTS

| | | | |
|---|---|---|---|
| 5,090,791 A | 2/1992 | Kidder | |
| 5,901,836 A | 5/1999 | Taniuchi | |
| 6,204,459 B1 * | 3/2001 | Kizele et al. | 200/302.1 |
| 6,392,179 B1 | 5/2002 | Schwarzbich | |
| 6,603,083 B2 * | 8/2003 | Amari et al. | 200/5 D |
| 7,589,292 B2 * | 9/2009 | Jung et al. | 200/512 |

FOREIGN PATENT DOCUMENTS

| | | |
|---|---|---|
| DE | 29715337 U1 | 1/1998 |
| DE | 19704419 C1 | 3/1998 |
| DE | 10058552 A1 | 5/2002 |
| DE | 102005015814 A1 | 10/2006 |
| EP | 0884525 A2 | 12/1998 |

OTHER PUBLICATIONS

Cussac, Yolaine, PCT Notification of Transmittal of Translation of the International Preliminary Report on Patentability for PCT Application No. PCT/EP2010/066523 (priority application for the present application), May 18, 2012, 18 pages, produced by the International Bureau of WIPO, Geneva, Switzerland.

* cited by examiner

ILLUMINATED BUTTON FOR AN OPERATOR CONTROL ARRANGEMENT, OPERATOR CONTROL ARRANGEMENT AND DOMESTIC APPLIANCE

CROSSREFERENCES TO RELATED APPLICATIONS

This application is a continuation of International Patent Application PCT/EP2010/066523 filed on Oct. 29, 2010, designating the U.S., the International Patent Application has been published in German language and claims priority from German Patent Application DE 10 2009 051 617, filed on Nov. 2, 2009. The entire contents of these priority applications are incorporated herein by reference.

BACKGROUND OF THE INVENTION

There is disclosed a button for an operator control arrangement, in particular for an operator control arrangement of a domestic appliance.

There is also disclosed an operator control arrangement including a panel, a housing, a printed circuit board and a button.

Further, there is disclosed a domestic appliance including a button.

In order to be able to operate a domestic appliance, it generally has operator control elements, in particular buttons, which are arranged on the domestic appliance as part of a panel arrangement—also called the system panel.

While switches were previously understood only as being a technical necessity, it has now been recognized that the operability of a domestic appliance, and in the process in particular the operation of the buttons, has a considerable influence on a decision to purchase said domestic appliance. For example, users expect both pleasant tactile feedback and also visual feedback when operating the button.

However, in addition to the customers' wishes, the buttons also have to fulfill further technical functions, including, primarily, safe and reliable transmission of an operating force to an electrical switching element which is associated with the button. Furthermore, the operator should be protected against an electric shock and the button or the associated electrical switching element should be protected against mechanical overloading by the user. Since modern switching elements, in particular microbuttons, generally do not have a sufficient restoring force, it is necessary to employ additional structural measures in order to return the button to an idle position again after it has been operated.

The prior art discloses a large number of switches and buttons which, together with a switching element, both provide a switching function and also offer illumination in order to provide for an operator control side of the switch or of the button. Merely by way of example, the two following documents will be discussed in this respect.

U.S. Pat. No. 5,090,791 shows a fiber-optic switch with self-illumination. The switch comprises a casing in which a touch-operated switch is guided. The touch-operated switch can be displaced against a spring. Waveguides which can guide light from a light source to an operator control side are arranged both in the casing and in the touch-operated switch. Different waveguides can be coupled to one another depending on the position and the orientation of the touch-operated switch relative to the casing.

U.S. Pat. No. 5,901,836 shows a switch having an illuminated knob. This document proposes providing a light guide in the form of a cylinder in a mechanical switch, said cylinder having a beveled surface. This makes it possible to fit a light source on the side, that is to say outside the region of the mechanism of the switch, and to couple the light out of the light source, via the beveled surface, into the light guide. The light then exits at the other end of the cylinder at an operator control side.

Even if the switches and buttons of the prior art can already realize different functional features, including the required illumination of a button, production of such buttons has now become extremely complex.

However, this is incompatible with general cost pressures which are also encountered in the market for domestic appliances. Therefore, attempts have been made to dispense with specific functions, including, in particular, the illumination of a button, but this has not been accepted above the low-price sector. Attempts to offer desired functionalities in simplified form have created the feeling amongst customers of the product having a lower perceived value.

SUMMARY OF THE INVENTION

Accordingly, it is an object is to present an improved button for an operator control arrangement, in particular for an operator control arrangement of a domestic appliance. The improvement is intended to be, in particular, that the button can be produced at a lower cost without having to compromise on the functionalities in the process. In addition, a correspondingly improved operator control arrangement and a correspondingly improved domestic appliance are intended to be disclosed.

According to a first aspect, the object is achieved by a button for an operator control arrangement, wherein the button has a shaped body which is composed of a light-guiding material, the shaped body including:

an operating direction in which the shaped body is displaced when the button is operated, a functional side which has a light entry region and an operating region, wherein the operating region is configured to operate a switching element when the button is operated, an operator control side which has a light exit region, wherein the shaped body is configured to guide at least a fraction of light, which enters at the light entry region, to the light exit region, a resilient projection which is integrally formed with the shaped body transverse to the operating direction and is configured in such a way that it deforms in an elastically resilient manner when it interacts with a housing part, in order to provide a restoring force for displacement of the button back to an idle position when the button is operated into an operating position, a force limiting element which is integrally formed with the shaped body transverse to the operating direction and is configured to absorb an excessive operating force by resilient displacement of the force limiting element when the operating region interacts with the switching element, and a first projection which is integrally formed with the shaped body and which is configured to interact with a housing part in order to thus form an end stop for operation of the button.

The button offers, amongst other things, the advantage that the proposed shaped body combines a large number of functions. For example, the shaped body offers both an illumination function via the light entry region and the light exit region, an operating function via its operating region and also a returning function via the resilient projection. In addition, the force limiting element provides effective overload protection: if the force limiting element is pressed against the switching element, said force limiting element deforms in an elastic manner. If the absorption element disengages from the switching element, the absorption element returns to its idle position.

The resilient action of the resilient projection and the characteristics of the force limiting element can be influenced by suitable selection of the geometry of the resilient projection or the force limiting element and by suitable selection of the material of the shaped body. If, for example, a rather rigid material is to be used for the button, the desired deformability and the restoring force can be achieved by the resilient projection having an adequate length. If the shaped body is composed of a somewhat softer material, a sufficient restoring force can be achieved by a relatively short and/or relatively thick resilient projection. The same considerations apply for the force limiting element.

The first projection is of comparatively rigid design, and therefore the first projection is not substantially deformed or displaced when a force is applied. Since the first projection is produced from the same material as the resilient projection, wherein the resilient projection is intended to be deformed in an elastically resilient manner, the first projection is preferably configured to be short and/or thick—in relation to the operating direction. That is, in comparison to the resilient projection which is configured to be rather elongate and thin. Since the first projection prevents operation of the button beyond a specific point, the first projection also serves as a part for preventing the resilient projection from bending too far.

The proposed design is advantageous particularly in the case of buttons with a short button travel since the previous multipart button structures can have a considerable error in relation to the button travel due to the sum of the tolerances of the individual parts. The proposed button therefore effectively reduces the risk of permanent switching on or of a switching point not being reached.

In contrast to the conventional switches and buttons from the prior art, the button disclosed allows to combine a plurality of functions in an integral shaped body. In addition, as will become apparent from the following explanations, the proposed shaped body also offers possibilities for additional functional expansion.

A further advantage which can be realized by the shaped body is protection of the electronics against liquids (safety aspect). If liquid enters the region of the button from the operator control panel, the liquid will be prevented from advancing in the direction of the printed circuit board: the liquid is retained by the shaped body and drips downward due to the force of gravity. To this end, the shaped body is formed with a plate-like widened portion, in particular in the region of the resilient projection, wherein the level of the widened portion is at least approximately perpendicular to the operating direction of the button.

Due to the integral design of the shaped body, the shaped body is preferably produced via an injection-molding process. As a result, it is particularly advantageously possible to combine a button, in particular a short-travel button, with restoring properties and illumination properties in an injection-molded part.

Here and below, the term "transverse to the operating direction" is intended to mean that an element, here: the resilient projection, extends in a direction which is at an angle of at least 15°, preferably at least 30°, particularly preferably of at least 45° and in particular of at least 60°, to the operating direction.

In an advantageous refinement, the force limiting element is in the form of a first bar with a first longitudinal side and a first transverse side, wherein the first longitudinal side is preferably longer than the first transverse side, particularly preferably more than twice as long as the first transverse side.

This refinement is cost-effective to realize and offers a simple way of adjusting the characteristics of the force limiting element in respect of the material of the shaped body. If the force limiting element bends along the longitudinal side, the stiffness of the force limiting element is increased by shortening the effective longitudinal side, widening the transverse side and/or strengthening the vertical side.

In a further advantageous refinement, the resilient projection is in the form of a second bar with a second longitudinal side and a second transverse side, wherein the second longitudinal side is preferably longer than the second transverse side, particularly preferably more than twice as long, and in particular more than three times as long, as the second transverse side.

This refinement is also cost-effective to realize and offers a simple way of adjusting the characteristics of the resilient projection in respect of the material of the shaped body. If the resilient projection bends along the longitudinal side, the elasticity of the force limiting element is increased by the effective longitudinal side being extended, the transverse side being narrowed and/or the vertical side being thinned out. In this connection, it is particularly advantageous when the shaped body has at least two, in particular at least three, resilient projections which all preferably extend at least approximately in one plane. As a result, a particularly uniform resilient action can be achieved.

In a further advantageous refinement, the shaped body has a second projection transverse to the operating direction, said second projection being integrally formed with the shaped body and being configured to interact with a panel in order to thus form a rest stop for an idle position of the button.

This embodiment provides for the beginning of the travel movement to be defined in a particularly simple manner. The designs relating to the configuration of the first projection apply to the configuration of the second projection. However, since the user cannot exert a force directly against the second projection when operating the button, the second projection does not have to meet the same stability requirements as the first projection.

In a further advantageous refinement, the shaped body has a guide element parallel to the operating direction, said guide element being integrally formed with the shaped body and being configured for guiding the button during operation along the operating direction.

This embodiment can provide for particularly good guidance of the button during its movement. In this case, it is particularly advantageous when the guide element interacts with a guide mating element on a housing part. In this case, the guide element is advantageously configured as an elongate projection—in relation to the operating direction—and the guide mating element is configured as a recess.

In a further advantageous refinement, the operator control side is at least approximately parallel to the functional side and, in particular, the operating region is arranged parallel to the light entry region, preferably in a common plane.

This embodiment of the button provides for a particularly advantageous structure of the operator control arrangement, in which structure the button will later be installed. If the operator control side is at least approximately parallel to the functional side, the operator control arrangement can be realized in a structurally simple manner in a kind of sandwich design comprising the panel, the housing part and the printed circuit board with the button arranged therebetween.

In a further advantageous refinement, which also represents an independent inventive development of the prior art taken on its own, that is to say also without the resilient projection, the force limiting element and the first projection, a first reflection surface is arranged in the shaped body, said first reflection surface deflecting light arriving from the light entry region in such a way that it can be guided to the light exit region, wherein the first reflection surface is formed, in particular, by a boundary surface of a recess within the shaped body.

Whereas some concepts have used outer boundary surfaces of a shaped body for light reflection or light refraction, a boundary surface within the shaped body is proposed here, as a result of which the outer shape of the shaped body can advantageously be selected largely independently of the internal boundary surface.

The light arriving from the light entry region is deflected via the reflection surface and then guided further to the light exit region. This provides for the position of the light entry region, light exit region and operating region to be freely selected—within specific boundary conditions. In this case, the first reflection surface is particularly arranged in such a way that a light source which is reflected at the reflection surface appears approximately in the center of the operator control side. A homogeneous lighting result can be achieved.

In a further advantageous refinement, the light in the shaped body has a first light main straight line at the light entry region and a second light main straight line at the light exit region, wherein the first and second light main straight lines are at least approximately parallel to one another.

This refinement provides for a structurally simple design. To put it simply, light enters the shaped body at a first point in a first direction, "first light main straight line", and leaves the shaped body at a second point in a second direction, "second light main straight line". In this case, the light enters, in particular, at a lower face of the shaped body and exits at an upper face of the shaped body, wherein the second light main straight line does not, however, coincide with the first light main straight lines.

In a further advantageous refinement, the operating region is situated opposite the light exit region when viewed along the operating direction.

The refinement is advantageous because a force which the user applies on the button, and therefore on the shaped body, on the operator control side can act on the switching element directly along an extremely short section between the operating region and the light exit region. As a result, tilting or tipping of the shaped body can be reduced or prevented.

As an indication of whether the operating region is situated opposite the light exit region, a check should be made, in particular, to determine whether the operating region and the light exit region overlap when viewed along the operating direction. If this is at least partially the case, the operating region is situated opposite the light exit region.

In this connection, it is also advantageous when the light entry region is not situated opposite the light exit region. This refinement has the advantage that the introduction of light into the shaped body can be selected independently of the positioning of the operating region and the light exit region. This opens up additional design options in respect of the shape of the shaped body.

In a further advantageous refinement, the first reflection surface is formed by a boundary surface of a recess within the shaped body.

This refinement provides for forming the first reflection surface in the shaped body in a simple manner. Even though it is considered to be advantageous from the point of view of cost-effective production to provide the boundary surface via a recess, it should be noted that a boundary surface of this kind can also be made within the shaped body in a different manner. For example, microcracks can be made in the interior of the shaped body by treatment with pulsed lasers in particular, it being possible for said microcracks to serve as a diffusely acting reflection surface.

In a further advantageous refinement, the shaped body has a main body and an extension having a transverse section and a longitudinal section, wherein the operating region and the light exit region are arranged on the main body and the light entry region is arranged on the extension, and wherein the transverse section protrudes from the main body transverse to the operating direction and merges with the longitudinal section which is at a distance from the main body and extends, in particular, at least approximately parallel to the operating direction.

This refinement takes particularly good consideration of the situation that the light source and switching element can be realized only at a distance from one another on an electrical printed circuit board which is used in conjunction with a button of this kind. In this refinement, it is possible to offset the light source in relation to the switching element and nevertheless couple the light into the main body in a simple manner.

In a further advantageous refinement, the extension has a second reflection surface which reflects light, which enters at the light entry region, in the direction of the main body, and wherein the second reflection surface is provided, in particular, by an outer boundary surface of the extension.

This refinement offers the possibility of being able to arrange the light entry region at a distance from the operating region in a simple manner, specifically in particular depending on an arrangement of the light source and switching element on an associated printed circuit board.

In a further advantageous refinement, the first and the second reflection surface are arranged such that light which enters at the light entry region is first guided to the second reflection surface at least approximately parallel to the operating direction, is reflected there in a direction transverse to the operating direction and is guided to the first reflection surface, is reflected there in a direction at least approximately parallel to the operating direction and is then guided to the light exit region.

The refinement provides for a particularly simple design of the shaped body. The term "transverse" in this context is also intended to mean that the angle in relation to the operating direction is at least 15°, preferably at least 30°, particularly preferably at least 45° and in particular at least 60°.

In a further advantageous refinement, the first and the second reflection surface are arranged at least approximately at an angle α of between 20° and 70°, preferably between 30° and 60°, particularly preferably between 40° and 50°, and in particular of at least approximately 45°, in relation to the operating direction.

This refinement provides for particularly favorable beam guidance within the shaped body.

According to a further aspect there is disclosed an operator control arrangement including a panel, a housing part, a printed circuit board and a button as described above, wherein the printed circuit board has a light source and a switching element, and wherein the button is mounted in a displaceable manner on the panel and on the housing part in such a way that the button, when it is operated, presses against the switching element and operates the switching element.

In this case, the light source is arranged in such a way that it emits light into the light entry region, and the switching element is arranged opposite the operating region.

According to a further aspect there is disclosed a domestic appliance including a button as described above.

It goes without saying that the features described above and those which will be explained below can be used both in their respectively specified combination and also in other combinations or on their own, without departing from the spirit and the scope of the present invention.

BRIEF DESCRIPTION OF THE DRAWINGS

Exemplary embodiments will be explained in greater detail in the following description and are illustrated in greater detail in the drawing, in which.

DESCRIPTION OF PREFERRED EMBODIMENTS

Figure 1:
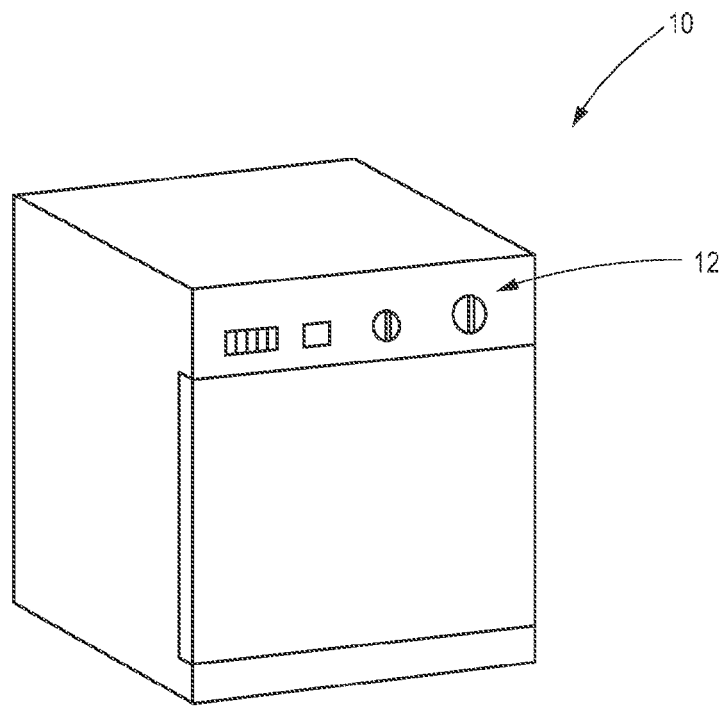
FIG. 1 shows a domestic appliance having a plurality of buttons.

FIG. 1 shows a domestic appliance 10 having an operator control arrangement 12. In the exemplary embodiment shown here, said domestic appliance is a dishwasher.

Figure 2:
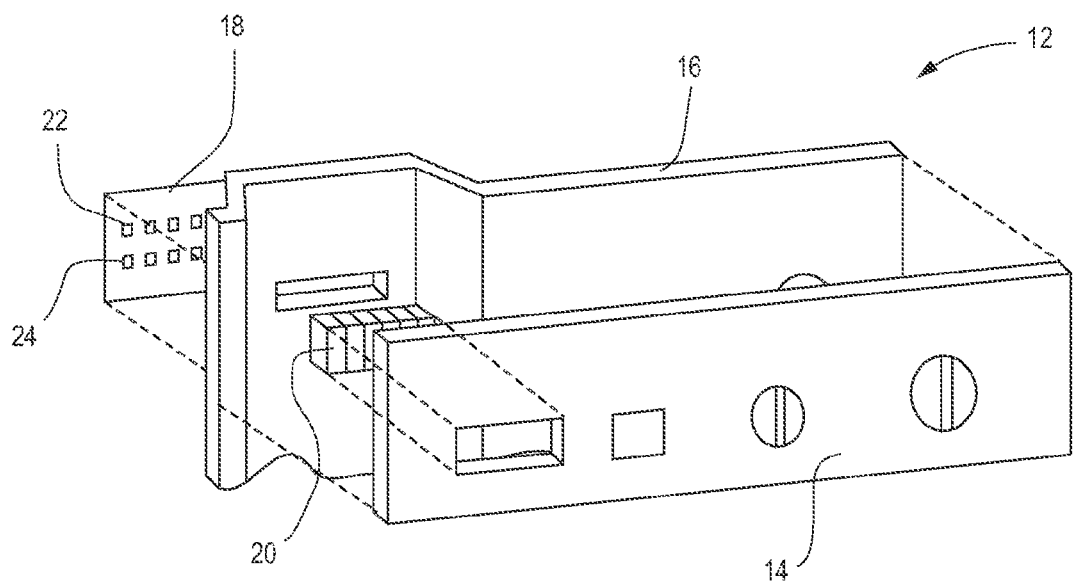
FIG. 2 shows a first exemplary embodiment of an operator control arrangement having a plurality of buttons.

FIG. 2 shows the operator control arrangement of the domestic appliance 10. Said operator control arrangement has a panel 14, a housing part 16 and a printed circuit board 18. At least one button 20 is arranged between the panel 14 and the housing part 16, here: six buttons 20. The dashed lines indicate how the individual parts are assembled to produce the finished domestic appliance 10.

A plurality of light sources 22 and a plurality of switching elements 24 are arranged on the printed circuit board 18. In the embodiment shown here, each button 20 has an associated light source 22 and an associated switching element 24. The buttons 20 are mounted in a displaceable manner on the panel 14 and on the housing part 16 in such a way that, when it is operated, each of the buttons 20 presses against the corresponding switching element 24 and operates the respective switching element 24.

Figure 3:
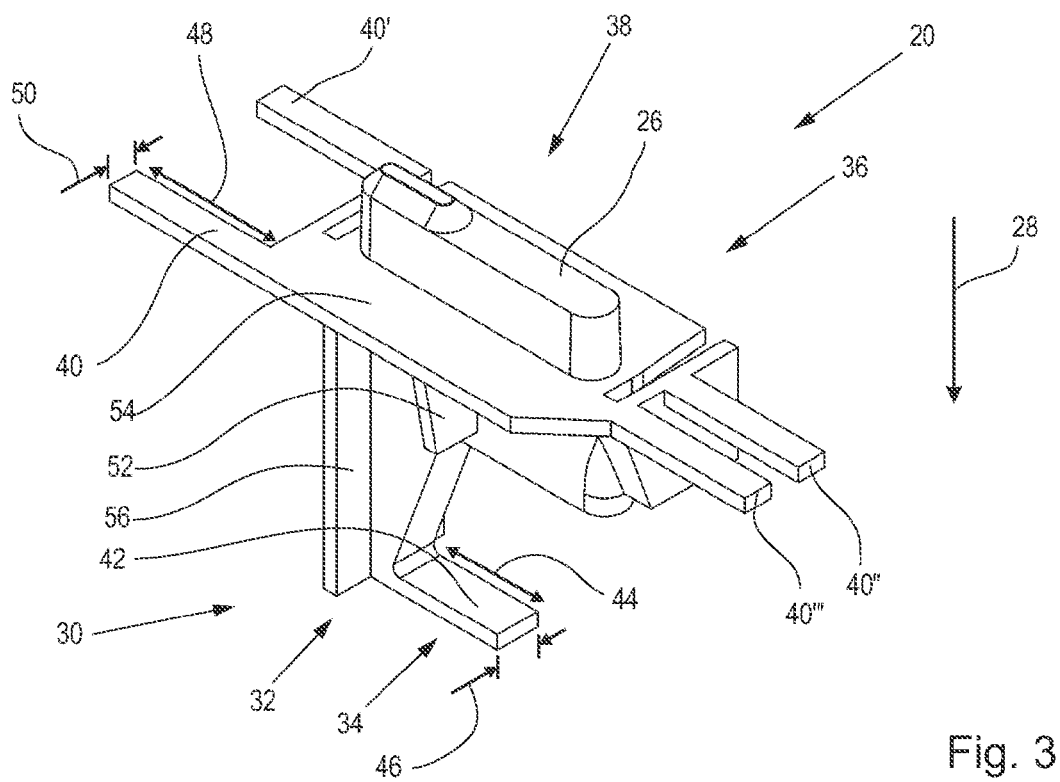
FIG. 3 shows a three-dimensional view of a first exemplary embodiment of a button.

FIG. 3 shows a first exemplary embodiment of a button 20 for an operator control arrangement 12. The button 20 has a shaped body 26 which is composed of a light-guiding material, wherein the shaped body 26 has an operating direction 28 in which said shaped body is displaced when the button 20 is operated.

The shaped body 26 has a functional side 30 which has a light entry region 32 and an operating region 34. The light entry region 32 is configured to couple light into the shaped body 26 via a boundary surface of the shaped body 26. The operating region 34 is configured to operate a switching element 24 when the button 20 is operated.

The shaped body 26 also has an operator control side 36 which has a light exit region 38, wherein the light exit region 38 is formed in such a way that light which is located in the shaped body 26 can be coupled out at a further boundary surface of the shaped body 26. The shaped body 26 is configured to guide at least a fraction of light, which enters at the light entry region 32, to the light exit region 38.

The following elements are also integrally formed with the shaped body 26 on the shaped body 26:

A resilient projection 40, here: four resilient projections 40, 40', 40", 40''', which is formed transverse to the operating direction 28 and is configured in such a way that it deforms in an elastically resilient manner when it interacts with a housing part 16, in order to provide a restoring force for displacement of the button 20 back to an idle position when the button 20 is operated into an operating position.

A force limiting element 42 which is formed transverse to the operating direction 28 and is configured to absorb an excessive operating force by resilient displacement of the force limiting element 42 when the operating region 34 interacts with the switching element 24.

A first projection 52 which is configured to interact with a housing part 16 in order to thus form an end stop for operation of the button 20.

The force limiting element 42 is in the form of a first bar with a first longitudinal side 44 and a first transverse side 46, wherein the first longitudinal side 44 is approximately twice as long as the first transverse side 46 in this case. The resilient projection 40 is in the form of a second bar with a second longitudinal side 48 and a second transverse side 50, wherein the second longitudinal side 48 is approximately three times as long as the second transverse side 50 in this case.

Furthermore, a second projection 54 is integrally formed with the shaped body 26 transverse to the operating direction on the shaped body 26. The second projection 54 is configured to interact with a panel 14 in order to thus form a rest stop for an idle position of the button 20. In the embodiment shown here, the second projection 54 is in the form of a surface beyond which the light exit region 38 projects. Looking at the extent of the second projection 54 perpendicular to the operating direction 28 in comparison to the extent of the light exit region 38 perpendicular to the operating direction 28, the extent of the second projection 54 is greater, in particular considerably greater, that is to say preferably at least 1.5 times as large and particularly preferably twice as large.

In addition, a guide element 56 is integrally formed with the shaped body 26 parallel to the operating direction 28 on the shaped body 26. The guide element 56 is configured to guide the button 20 along the operating direction 28 during operation. To be more precise, guidance is achieved by interaction with a guide mating element 64 (see FIG. 5) on the housing part 16.

The button 20 shown has the advantage, amongst others, that the shaped body 26 is integrally produced with all its functional regions. In particular, the button 20 shown combines a return function, an overload protection and additionally illumination properties in one shaped body 26. This leads to considerable simplifications and cost savings, in particular when said button is used as a short-stroke button.

Looking at the shaped body 26, it is noted that the operator control side 36 is at least approximately parallel to the functional side 30. In addition, the operating region 34 is arranged parallel to the light entry region 32, in particular in a common plane in this case. The second projection 54 and the resilient projections 40, 40', 40", 40''' are also arranged in a common further plane.

Figure 4:
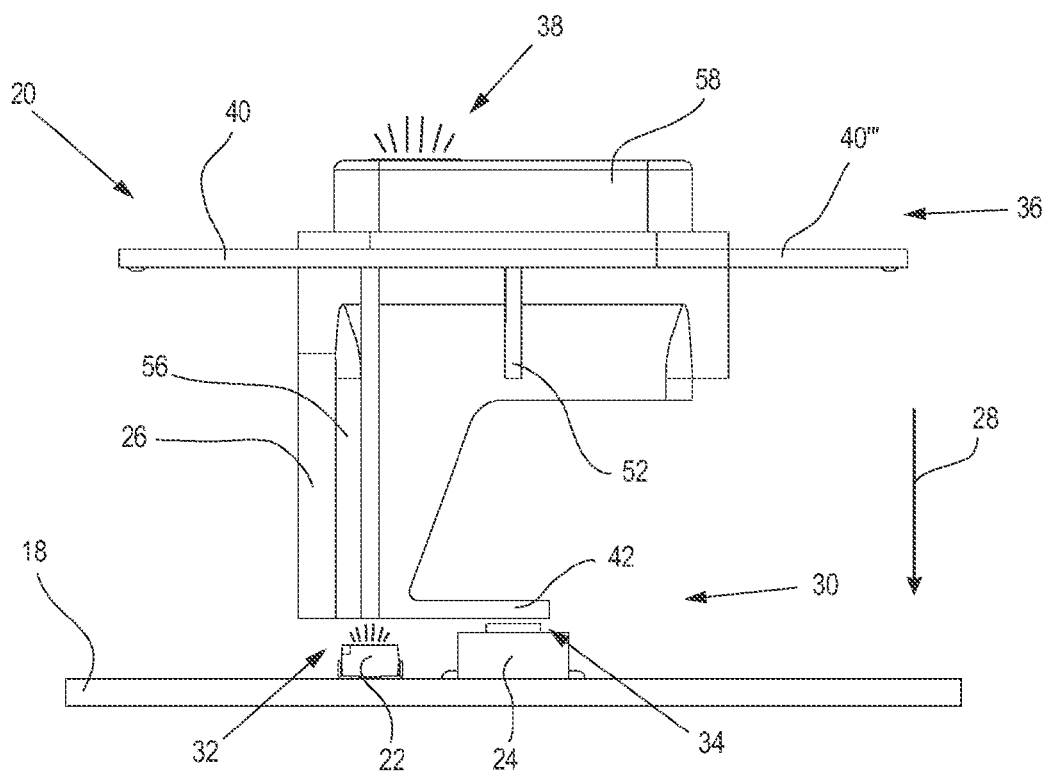
FIG. 4 shows a lateral plan view of the button according to FIG. 3 with an associated cover and printed circuit board.

FIG. 4 shows a side view of the shaped body 26, wherein a printed circuit board 18, which has a light source 22 and a switching element 24, here a microbutton, and a covering cap 58 are also shown to illustrate the functions of the functional side 30 and the operator control side 36. Said figure shows that the shaped body 26 operates the switching element 24 by way of the operating region 34 on the force limiting element 42 when the button 20 is operated. If the button 20 is pressed somewhat too forcefully, the force limiting element 42 yields in a resilient manner. The covering cap 58 has the effect that the light exit region 38 can be defined in a specific manner.

This lateral view shows that the shaped body approximately forms a "C", wherein the upper part of the "C" is formed by the operator control side 36 and the lower part of the "C" is formed by the functional side 30. The lower free end of the "C" contains the operating region 34.

Figure 5:
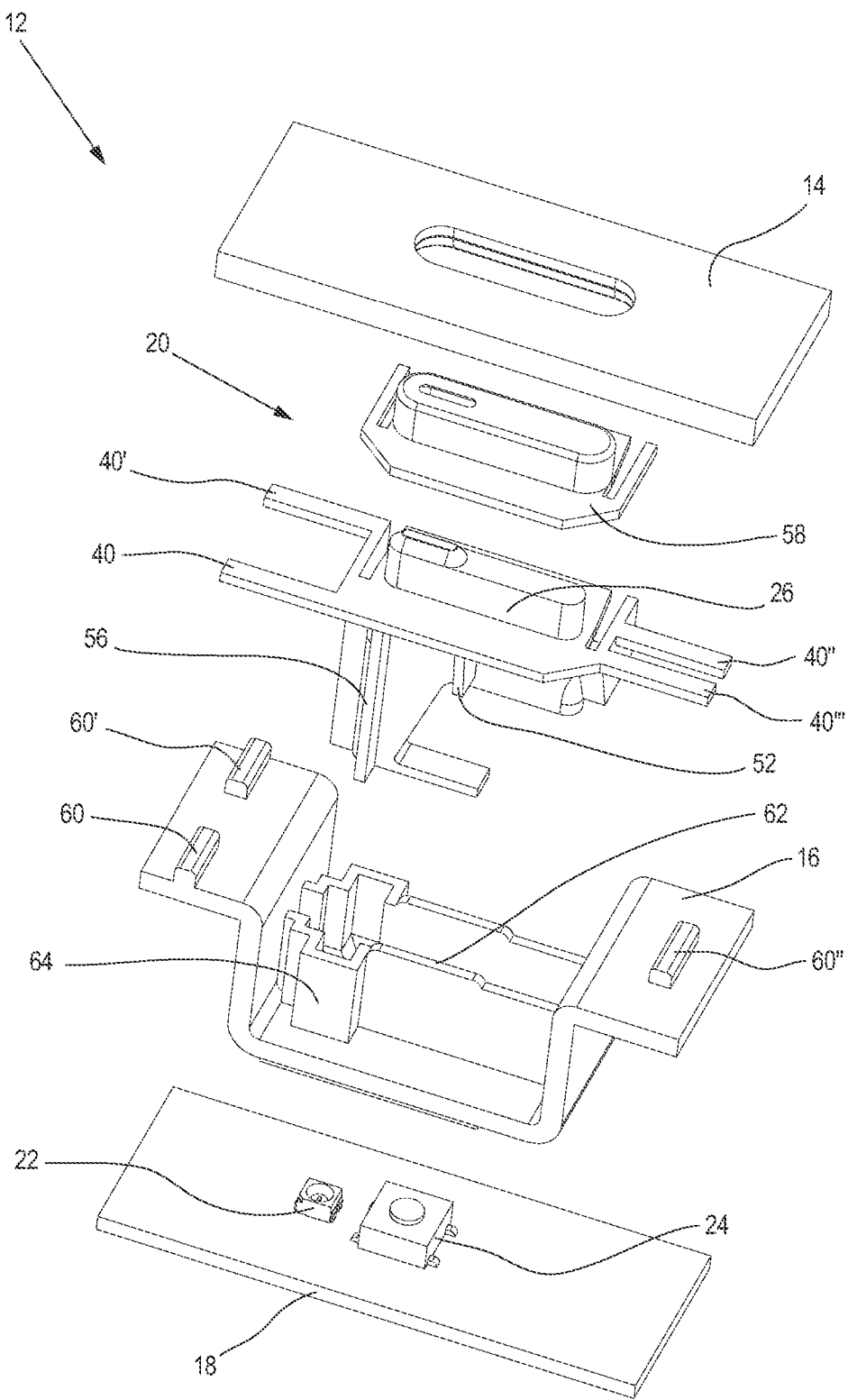
FIG. 5 shows a second exemplary embodiment of an operator control arrangement.

FIG. 5 shows, in a simplified exploded view, how the shaped body 26 according to FIG. 3 of the button 20 is integrated in an operator control arrangement 12. This illustration also shows that the resilient projections 40, 40', 40", 40"' interact with mating bearings 60, 60', 60" on the housing part 16.

The first projection 52 interacts with a stop 62 on the housing part 16. The guide element 56 is guided in a guide mating element 64 which is formed on the housing part 16. The housing part 16 is in the form of a trough or a "U", wherein the trough has wide edge regions on which the mating bearings 60, 60', 60" are arranged. The stop 62 and the guide mating element 64 are arranged in the trough in a recessed manner or in the lower region of the "U".

Figure 6:
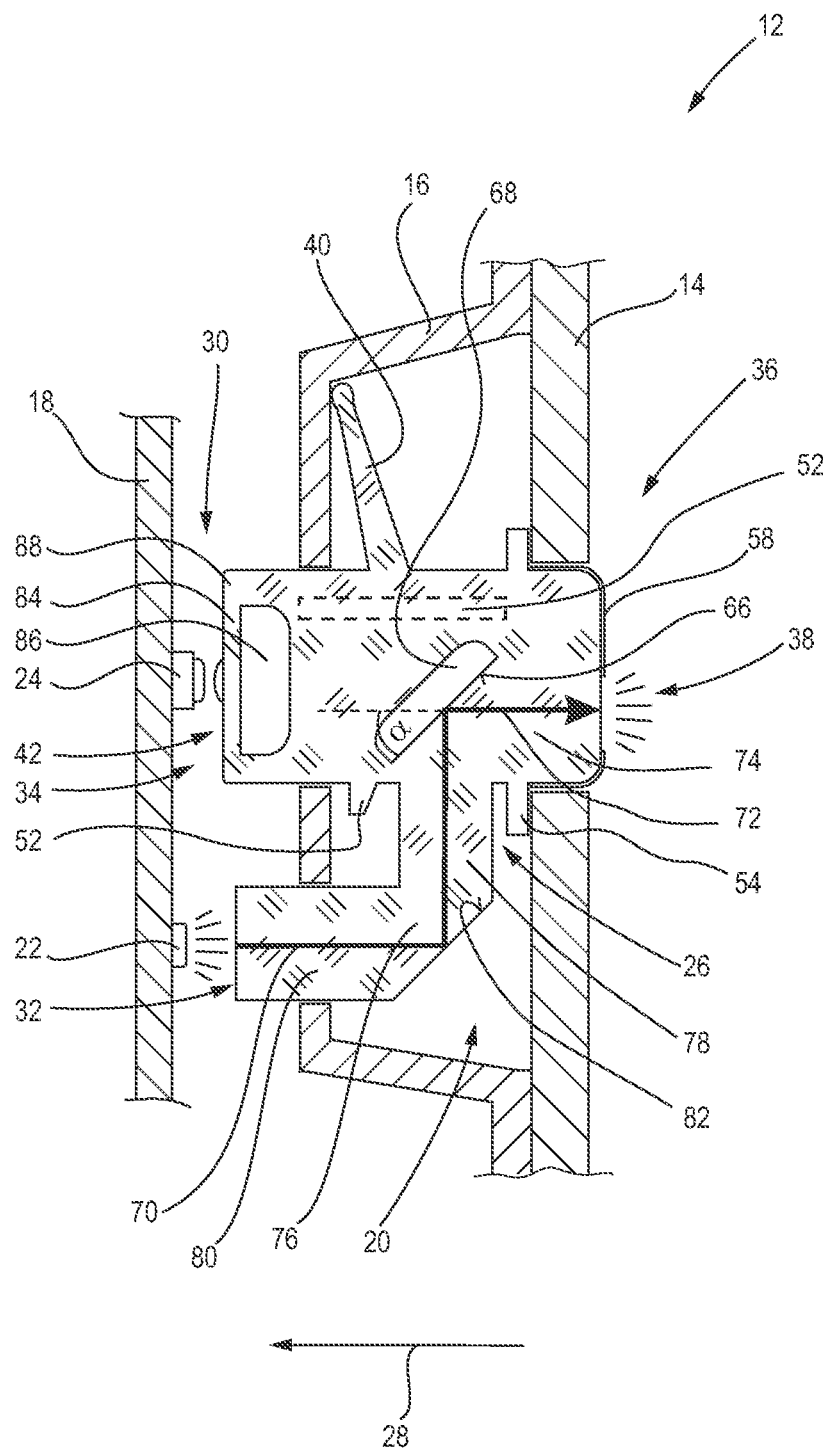
FIG. 6 shows a second exemplary embodiment of a button.

FIG. 6 shows a second embodiment of a button 20 in an operator control arrangement 12 which, on its own, is also an independent and autonomous further development over the prior art. In this embodiment too, the same reference symbols apply to the same functional elements, even if said functional elements are configured differently.

In this case, one special feature of this embodiment is that a first reflection surface 66 is arranged in the shaped body 26, said first reflection surface deflecting light arriving from the light entry region 32 in such a way that said light is guided to the light exit region 38, wherein the first reflection surface 66 is formed, in particular, by a boundary surface of a recess 68 within the shaped body 26.

The light in the shaped body 26 has a first light main straight line 70 at the light entry region 32 and a second light main straight line 72 at the light exit region 38, wherein the first and second light main straight lines 70, 72 are at least approximately parallel to one another. When viewed along the operating direction 28, the operating region 34 is situated opposite the light exit region 38. This is advantageous in respect of the mechanical operation of the switching element 24.

A further special feature of this exemplary embodiment is that the shaped body 26 has a main body 74 and an extension 76 having a transverse section 78 and a longitudinal section 80. The operating region 34 and the light exit region 38 are arranged on the main body 74 and the light entry region 32 is arranged on the extension 76. The transverse section 78 is transverse, here: protrudes from the main body 74 approximately at a right angle, to the operating direction 28 and merges with the longitudinal section 80. The longitudinal section 80 is at a distance from the main body 74 and extends at least approximately parallel to the operating direction 28.

The extension 76 has a second reflection surface 82 which reflects light, which enters at the light entry region 32, in the direction of the main body 74, wherein the second reflection surface 82 is provided by an outer boundary surface of the extension 76.

Overall, the first and the second reflection surface 66, 82 are arranged such that light which enters at the light entry region 32 is first guided to the second reflection surface 82 at least approximately parallel to the operating direction 28, is reflected there in a direction transverse to the operating direction 28, in particular perpendicular to the operating direction 28, and is guided from there to the first reflection surface 66. From there, the light is then reflected in a direction at least approximately parallel to the operating direction 28 and then guided to the light exit region 38.

The first and the second reflection surface 66, 82 are arranged at least approximately at an angle $\alpha=45°$ in relation to the operating direction 28.

In this embodiment, the force limiting element 42 is realized by an elastic layer 84 which is integrally formed with the shaped body 26 by a further recess 86 having been made in the shaped body 26. If the force limiting element 42 is pressed against the switching element 24, the layer 84 deforms into the recess 86. The design can be particularly advantageously selected such that the edge 88 of the recess 86 can bear against the printed circuit board 18 in order to also be able to absorb a strong force.

Therefore, a novel button, a novel operator control arrangement and a novel domestic appliance, which can all be produced in a more cost-effective and simpler manner, have been disclosed overall.

What is claimed is:

1. A button for an operator control arrangement, wherein the button has a shaped body which is composed of a light-guiding material, the shaped body including:
   an operating direction in which the shaped body is displaced when the button is operated,
   a functional side which has a light entry region and an operating region, wherein the operating region is configured to operate a switching element when the button is operated,
   an operator control side which has a light exit region, wherein the shaped body is configured for guiding at least a fraction of light, which enters at the light entry region, to the light exit region,
   a resilient projection which is integrally formed with the shaped body transverse to the operating direction and is configured in such a way that it deforms in an elastically resilient manner when it interacts with a housing part, in order to provide a restoring force for displacement of the button back to an idle position when the button is operated into an operating position,
   a force limiting element which is integrally formed with the shaped body transverse to the operating direction and is configured to absorb an excessive operating force by resilient displacement of the force limiting element when the operating region interacts with the switching element, and
   a first projection which is integrally formed with the shaped body and which is configured to interact with a housing part in order to thus form an end stop for operation of the button.

2. The button according to claim 1, wherein the force limiting element is in the form of a first bar with a first longitudinal side and a first transverse side.

3. The button according to claim 2, wherein the first longitudinal side is longer than the first transverse side.

4. The button according to claim 1, wherein the resilient projection is in the form of a second bar with a second longitudinal side and a second transverse side.

5. The button according to claim 4, wherein the second longitudinal side is longer than the second transverse side.

6. The button according to claim 1, wherein the shaped body has a second projection transverse to the operating direction, said second projection being integrally formed with the shaped body and being configured to interact with a panel in order to thus form a rest stop for an idle position of the button.

7. The button according to claim 1, wherein the shaped body has a guide element parallel to the operating direction, said guide element being integrally formed with the shaped body and being configured for guiding the button during operation along the operating direction.

8. The button according to claim 1, wherein the operator control side is at least approximately parallel to the functional side.

9. The button according to claim 1, wherein the operating region is arranged parallel to the light entry region.

10. The button according to claim 1, wherein a first reflection surface is arranged in the shaped body, said reflection surface deflecting light arriving from the light entry region in such a way that it can be guided to the light exit region.

11. The button according to claim 1, wherein the light in the shaped body has a first light main straight line at the light entry region and a second light main straight line at the light exit region, wherein the first and second light main straight lines are at least approximately parallel to one another.

12. The button according to claim 1, wherein the operating region is situated opposite the light exit region when viewed along the operating direction.

13. The button according to claim 1, wherein the shaped body has a main body and an extension having a transverse section and a longitudinal section, wherein the operating region and the light exit region are arranged on the main body and the light entry region is arranged on the extension, and wherein the transverse section protrudes from the main body transverse to the operating direction and merges with the longitudinal section which is at a distance from the main body.

14. The button according to claim 13, wherein the extension has a second reflection surface which reflects light, which enters at the light entry region, in the direction of the main body.

15. The button according to claim 14, wherein the first and the second reflection surface are arranged such that light which enters at the light entry region is first guided to the second reflection surface at least approximately parallel to the operating direction, is reflected there in a direction transverse to the operating direction and is guided to the first reflection surface, is reflected there in a direction at least approximately parallel to the operating direction and is then guided to the light exit region.

16. The button according to claim 14, wherein the first and the second reflection surface are arranged at least approximately at an angle of between 20° and 70° in relation to the operating direction.

17. An operator control arrangement having a panel, a housing part, a printed circuit board and a button according to claim 1, wherein the printed circuit board has a light source and a switching element, and wherein the button is mounted in a displaceable manner on the panel and on the housing part in such a way that the button, when it is operated, presses against the switching element and operates the switching element.

18. A domestic appliance having a button according to claim 1.

19. A button for an operator control arrangement, wherein the button has a shaped body, the shaped body including:
an operating direction in which the shaped body is displaced when the button is operated,
a functional side which has an operating region, wherein the operating region is configured to operate a switching element when the button is operated,
an operator control side,
a resilient projection which is integrally formed with the shaped body transverse to the operating direction and is configured in such a way that it deforms in an elastically resilient manner when it interacts with a housing part, in order to provide a restoring force for displacement of the button back to an idle position when the button is operated into an operating position,
a force limiting element which is integrally formed with the shaped body transverse to the operating direction and is configured to absorb an excessive operating force by resilient displacement of the force limiting element when the operating region interacts with the switching element, and
a first projection which is integrally formed with the shaped body and which is configured to interact with a housing part in order to thus form an end stop for operation of the button.

20. A button for an operator control arrangement, wherein the button has a body which is composed of a light-guiding material, the body including:
an operating direction in which the body is displaced when the button is operated,
a functional side which has a light entry region and an operating region, wherein the operating region is configured to operate a switching element when the button is operated,
an operator control side which has a light exit region, wherein the body is configured for guiding at least a fraction of light, which enters at the light entry region, to the light exit region,
a resilient projection which is integrally formed with the body transverse to the operating direction and is configured to deform in an elastically resilient manner,
a force limiting element formed transverse to the operating direction and configured to absorb an excessive operating force by resilient displacement of the force limiting element when the operating region interacts with the switching element, and
a first projection which is configured to interact with a housing part in order to thus form an end stop for operation of the button.

* * * * *